W. H. LARRABEE.
RUBBER GEAR FOR WATER METERS.
APPLICATION FILED DEC. 17, 1909.

1,007,296.  Patented Oct. 31, 1911.

Witnesses.
K. A. Humphrey
Ella P. Blenus.

Inventor.
William H. Larrabee,
By Chas. H. Burleigh,
Attorney

UNITED STATES PATENT OFFICE.

WILLIAM H. LARRABEE, OF WORCESTER, MASSACHUSETTS, ASSIGNOR TO UNION WATER METER COMPANY, OF WORCESTER, MASSACHUSETTS, A CORPORATION OF MASSACHUSETTS.

RUBBER GEAR FOR WATER-METERS.

1,007,296.  Specification of Letters Patent.  Patented Oct. 31, 1911.

Application filed December 17, 1909. Serial No. 533,586.

*To all whom it may concern:*

Be it known that I, WILLIAM H. LARRABEE, a citizen of the United States, residing at Worcester, in the county of Worcester and State of Massachusetts, have invented a new and useful Improved Rubber Gear for Water-Meters, of which the following is a specification, reference being made therein to the accompanying drawings.

This invention relates more especially to gears designed for employment in water-meters, or other similar mechanism, wherein the gears are required to be of a non-corrodible nature and to operate immersed in water or a liquid medium; and wherein it is desirable to have the specific gravity of the gears as near that of the water as can conveniently be done; the gear being constructed of suitably efficient material.

Hard rubber or vulcanite gears have heretofore been used in certain types of water-meters, usually to run in conjunction with bronze or brass pinions, and such gears have proved excellent under easy service and light power, but it has been found that in the larger sized mechanisms there is liability of the gear teeth becoming broken off when sudden strain is brought upon them; especially after they have been in use for a considerable time and the rubber has become somewhat deteriorated by exposure and time.

The prime object of my present invention is to provide a practically noncorrodible toothed gear of light weight; strong, durable and highly efficient for the purposes specified, and in which the teeth will not be liable to become broken off in operating under severe strain; also, an integral vulcanized gear having a thin metallic peripheral reinforce exposed in its toothed face, intermediate the ends of the teeth, for the purpose set forth.

The nature and construction of my improved gear is illustrated in the accompanying drawings, and hereinafter explained with references thereto; the particular subject-matter claimed being definitely set forth in the summary.

Figure 1:
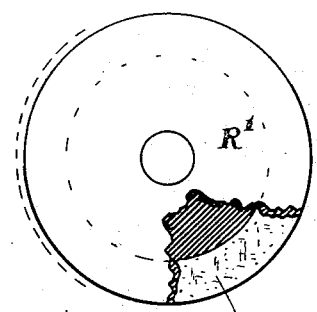
Figures 5, 6:
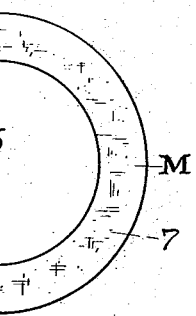
Figure 2:
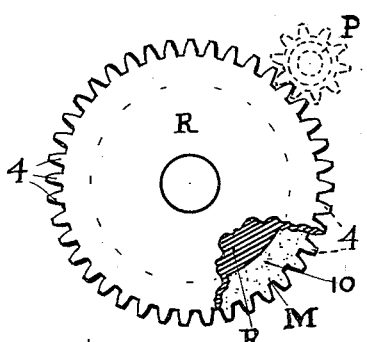
Figures 7, 8:
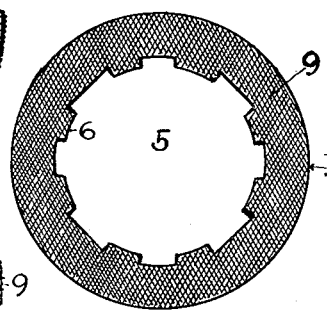
Figure 3:
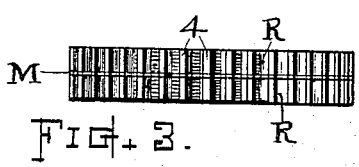
Figure 4:
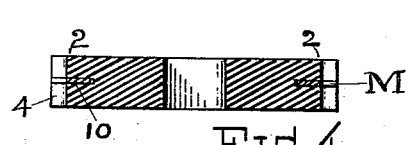
Figure 9:
Figure 10:
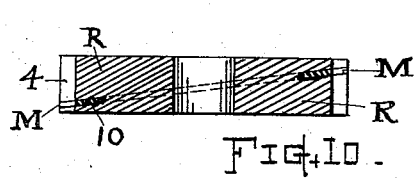

In the drawings, Figure 1 represents a plan view of the prepared gear-blank as molded and turned to the required size, and Fig. 2 a plan view of the gear completed. In each of these views a portion is shown broken away to reveal the internal structure. Fig. 3 is a view of the toothed face of the gear. Fig. 4 is a transverse central section. Fig. 5 is a plan view, and Fig. 6 a cross-section of the annular metal reinforce plate. Fig. 7 is a plan view illustrating the annular reinforce plate as having a dentated or irregular inner edge; also showing a scored, roughened or knurled side surface. Fig. 8 is a cross-section view illustrating a curved or warped annular reinforce plate. Fig. 9 is a view of the face of my toothed rubber gear, illustrating the arrangement of the curved, corrugated or warped annular reinforce therein, and Fig. 10 is a central cross-section of my toothed rubber gear illustrating the arrangement of a flat annular reinforce plate disposed therein inclined to the plane of the gear disk.

My invention consists in providing a vulcanized hard-rubber toothed gear with an internal integrally united comparatively thin annular plate of brass, or any suitable bronze alloy, embedded in the peripheral portion of the hard-rubber body, and exposed at the face of the gear intermediate the ends of the teeth, and forming a narrow metallic reinforce extending through and conforming to the outline contour of the teeth and spaces.

Referring to the drawings, R indicates the body of the gear, which is composed of hard rubber or vulcanite, and M indicates the thin annular plate or ring of brass or bronze alloy. This ring or annulus is preferably about one thirty-second of an inch, more or less, in thickness. Its outside diameter is made approximately equal to the size of the gear blank $R^1$, while its inside diameter is somewhat less than the diameter at the roots 2 of the gear teeth 4, so that it forms a complete circle within the circle of the teeth.

In the construction of the ring M its central opening 5 can be circular, as shown in Fig. 5; or preferably formed with a dentated or irregular edge 6, of any approved shape, as in Fig. 7. The side faces of the annulus can be plain, as at 7, or may be roughened, scored, or knurled, as at 9, to afford the rubber a stronger grip or adhesion to the metal.

The method of making this improved gear is as follows: The thin brass annulus M is placed in a suitable mold, together with and between two disks or masses of rubber compound sufficient for the desired thickness of the gear. This assemblage is put under formative pressure and in that condition vulcanized by the usual process of vulcanization; causing the upper and lower masses of rubber to compactly unite through the central opening of the annulus, and to firmly adhere to the sides and inner edge of the brass; the resultant blank $R^1$ being a solid homogeneous circular block of hard-rubber having within its peripheral portion, and firmly vulcanized therein, the thin metal annulus M. This block is then turned down in a lathe to the desired dimension of the gear-blank, Fig. 1, after which the gear teeth 4 are cut thereon by any well known gear-cutting mechanism; the teeth being cut through the rubber and brass leaving the surfaces flush and with the narrow edge of the metal exposed along the face of the gear intermediate the ends of the teeth; the respective teeth being thus composed of two comparatively thick sections of rubber and a comparatively thin section of brass, or other bronze alloy, as illustrated. The plate extends through and reinforces the projecting part of each tooth, and connects all of the teeth across the bottom of the space between the teeth, as at 10. Thus while the non-corrodible and light running qualities of the rubber gear are maintained, the thin brass element, combined as it is, greatly enhances the strength, durability and efficiency of the gear without materially increasing its weight.

The thin brass annulus may be incorporated into the rubber so as to form a reinforce about the face of the gear uniformly distant from either side of the gear disk, as in Fig. 3; or it may be disposed at an oblique or inclined relation, as in Fig. 10; or again, in some instances the annulus is curved or bent and incorporated with the rubber so that the exposed edge of brass has a serpentine or wave form, as in Fig. 9. In the latter instances (Figs. 9 and 10) the contact line of the reinforce M is variable in respect to the pinion so as to cause the brass portion of one gear tooth to bear on the bronze pinion P at a different plane than that of the following tooth; thus equalizing the wear of the metal along the length of the pinion teeth, instead of concentrating such wear at one place thereon.

What I claim and desire to secure by Letters Patent, is—

1. A toothed vulcanized gear formed of rubber, with a thin annular plate of bronze alloy therein at its periphery, disposed so that the gear-teeth are composed of two comparatively thick side sections of rubber and a thin intermediate section of bronze, said rubber sections being integrally united with each other through the central space of the annular plate, and solidly incorporated with the sides of said plate as a unitary body, and presenting at the toothed periphery a continuous surface without joint fissure.

2. The combination, in a toothed gear, of a solid gear body formed of hard rubber, and an annulus of thin brass embedded therein and extending around the circumferential edge of said body, the rubber integrally united within the annulus, the outer edge of said brass annulus conforming to the shape of the gear-teeth and flush with the surfaces of said teeth.

3. A toothed gear-wheel, mainly composed of vulcanized material having solidly incorporated therein a thin annular plate of bronze metal, the inner diameter of said annular plate being of greater diameter than the central eye of the gear, and its outer edge conformed to the shape of the gear-teeth and exposed along the gear face intermediate to the ends of the teeth; the vulcanized body substance being solidly united through the area within the annulus and integrally adherent to the opposite faces of said annulus and forming an inseparable connection therewith.

4. A toothed gear wheel having a vulcanized rubber body with a metal plate integrally embedded therein, with the edge of the metal exposed in the wearing faces of the gear-teeth, the annular central portion of said body being homogeneous and solid.

5. A vulcanized toothed gear-wheel having a single internally dentated thin reinforce annulus of non-corroding metal solidly incorporated therein about its periphery, including its teeth, and edgewise exposed at the face of the gear; said annulus being inclined in relation to the plane of the gear disk; the portions of the gear above and below the reinforce cohesively united within the circle of the annulus, and solidly adhering to the surface of the metal, for the purpose set forth.

Witness my hand this 16th day of December, 1909.

WILLIAM H. LARRABEE.

Witnesses:
CHAS. H. BURLEIGH,
ERNEST J. TITCOMB.